(12) United States Patent
Van Den Berg et al.

(10) Patent No.: US 10,913,300 B2
(45) Date of Patent: Feb. 9, 2021

(54) SECURITY DOCUMENT WITH POSITIVE AND NEGATIVE AUTHENTICATION TILT IMAGES

(71) Applicant: MORPHO B.V., Haarlem (NL)

(72) Inventors: Jan Van Den Berg, Gouda (NL); Erik Van Dijk, Haarlem (NL)

(73) Assignee: MORPHO B.V., Haarlem (NL)

( * ) Notice: Subject to any disclaimer, the term of this patent is extended or adjusted under 35 U.S.C. 154(b) by 0 days.

(21) Appl. No.: 16/461,006

(22) PCT Filed: Nov. 14, 2017

(86) PCT No.: PCT/NL2017/050736
§ 371 (c)(1),
(2) Date: May 15, 2019

(87) PCT Pub. No.: WO2018/093251
PCT Pub. Date: May 24, 2018

(65) Prior Publication Data
US 2019/0308432 A1 Oct. 10, 2019

(30) Foreign Application Priority Data
Nov. 15, 2016 (NL) ..................................... 2017793

(51) Int. Cl.
*B41M 3/14* (2006.01)
*B42D 25/29* (2014.01)
(Continued)

(52) U.S. Cl.
CPC ............. *B41M 3/148* (2013.01); *B42D 25/23* (2014.10); *B42D 25/29* (2014.10); *B42D 25/435* (2014.10); *G06F 21/30* (2013.01)

(58) Field of Classification Search
CPC ........ B41M 3/148; B42D 25/29; B42D 25/23; B42D 25/435; G06F 21/30
(Continued)

(56) References Cited

U.S. PATENT DOCUMENTS 4,765,656 A 8/1988 Becker et al.
8,582,208 B2 11/2013 Van Den Berg
(Continued)

FOREIGN PATENT DOCUMENTS

EP 0219012 A2 4/1987
FR 299164 A 4/2014
(Continued)

OTHER PUBLICATIONS

International Search Report and Written Opinion, dated Jan. 25, 2018, from corresponding PCT application No. PCT/NL2017/050736.

*Primary Examiner* — Justin V Lewis
(74) *Attorney, Agent, or Firm* — Nixon & Vanderhye

(57) ABSTRACT

Disclosed is a security document including an image layer with in a first image area an identification image. The document has in a second image area an authentication image that is composed of a first authentication image that is a positive version of the first image and a second authentication image that is a negative version of the first image. The authentication images can be observed at different angles and form a tilt image. Mutual comparison of the positive and negative tilt images and comparison with the identification image provides improved detection of unauthorized alterations.

5 Claims, 4 Drawing Sheets

(51) Int. Cl.
*B42D 25/23* (2014.01)
*B42D 25/435* (2014.01)
*G06F 21/30* (2013.01)

(58) Field of Classification Search
USPC ..... 283/67, 70, 72, 74, 87, 94, 98, 109, 110, 283/901
See application file for complete search history.

(56) References Cited

U.S. PATENT DOCUMENTS

| | | |
|---|---|---|
| 9,873,282 B2 | 1/2018 | Jolic |
| 9,944,109 B2 | 4/2018 | Nijssen et al. |
| 2011/0115211 A1* | 5/2011 | Feneyrou ............... B42D 25/41 283/74 |
| 2012/0327517 A1 | 12/2012 | Van Den Berg |
| 2014/0306441 A1* | 10/2014 | Lister ...................... G03C 5/08 283/85 |

FOREIGN PATENT DOCUMENTS

| | | |
|---|---|---|
| WO | 2011/074956 A1 | 6/2011 |
| WO | 2012/027779 A1 | 3/2012 |
| WO | 2014/098573 A2 | 6/2014 |
| WO | 2015/030575 A1 | 3/2015 |
| WO | 2016/010415 A1 | 1/2016 |

* cited by examiner

SECURITY DOCUMENT WITH POSITIVE AND NEGATIVE AUTHENTICATION TILT IMAGES

FIELD OF THE INVENTION

The invention relates to a security document comprising an image layer with in a first image area an identification image comprising picture elements with predetermined brightness values on a positive brightness scale, and in a second image area an authentication image corresponding with the first image, the authentication image comprising at least two images situated below lenses such that at a first observation angle, a first authentication image is visible and at a second observation angle a second authentication image is visible. The invention also relates to a method of manufacturing such a security document.

BACKGROUND OF THE INVENTION

Such a security document is known from WO20-14/098573 in the name of the applicant, in which a security document is provided with a first two-dimensional portrait image as a primary image or "identification" image, and a stereoscopic image corresponding to the portrait image serving as a secondary image or "authentication" image.

The stereoscopic image consists of two or more portrait images showing the portrait at different angles. These images are laser engraved in an interlaced manner below a number of cylindrical lenses into a laser sensitive image layer. The user inspecting the security document observes below the lenses with each eye a respective portrait image such that a stereoscopic image is formed.

In WO 2012/027779 it is described that in security documents, such as bank notes, two contrast-inverted images may be placed below a set of lenses, outside the focal plane such that a tilt image effect is obtained with reduced cross-talk. From a first viewing angle, a first image is seen with the second image forming a uniform light or dark background, whereas the second viewing angle presents the second, contrast inverted image sharply in the foreground with the first image forming a uniform background.

In EP 0 219 012 a method of forming a tilt image or a stereoscopic image below a set of cylindrical lenses is described by means of laser engraving images in an interlaced manner through the lenses in an underlying layer of laser sensitive material.

In WO 2016/010415, in the name of the applicant, a security document is described comprising a set of lenses below which the authentication image is provided at a pitch that differs from the pitch of the lenses, such that a Moiré magnifying effect is achieved. WO 2011/074956, in the name of the applicant describes a security document in which below a set of cylindrical lenses, an image is laser engraved in an out of focus manner in order to reduce transient black patterns appearing on tilting of the image.

WO 2015/030575 describes a security document, in particular a passport, in which a transparent window is provided onto which an authentication image is formed. The authentication is also formed in the underlying layer adjacent the transparent window.

The above authentication images provide a security feature which enables detection of unauthorized alterations to the main image. At the same time, the authentication image cannot be easily altered without being noticed due to its complex structure and the special optical effects that are produced by the authentication image.

It is an object of the present invention to provide a security document with a main image and an authentication image of the above described type that allows rapid and reliable detection of unauthorized alterations to the main image.

It is also an object of the present invention to provide a security document having an authentication image that is resistant to unauthorized alterations and that allows easy and reliable detection of such alterations.

SUMMARY OF THE INVENTION

Hereto in the security document in accordance with the present invention, the first authentication image is a positive image corresponding with the first image with picture elements having brightness values that correspond to the brightness values of the identification image and the second authentication image is a negative image corresponding with the first image, with picture elements having brightness values that correspond to a reversed brightness scale that is obtained by making the brightest picture elements in the positive brightness scale appear darkest and the darkest picture elements appear brightest, wherein both the identification image and the first authentication image can be observed at a perpendicular viewing direction while the second authentication image can be observed at a non-perpendicular viewing direction.

It was found that a tilt image consisting of a positive and a negative image of the same object allows effective control of the authentication image for unauthorized alterations. The negative authentication image prevents the addition of any additional dark image information to the secondary image by subsequent laser personalization. Hence, the security feature according to the invention prevents a simultaneous manipulation of the primary identification image (e.g. a portrait image) and of the secondary authentication image and safeguards the portrait effectively from forgery attempts.

By tilting the security document, the inspecting person can rapidly switch the authentication image from a positive to a negative image. The optical impression obtained by the light to dark transition of the authentication image allows the inspecting person to effectively determine if the authentication image is without alterations and if it corresponds to the main image. It is submitted that upon switching from a positive to a negative image, the positive image remains present as a visual stimulus for the inspecting person while viewing the negative image, such that identity of these images can be properly established. The correspondence with the main image is reliably made on the basis of the observation of the positive authentication image.

The security document according to the invention may comprise a plastic card such as a bank or credit card, an access pass or an identity card or badge, a driver's license or may comprise a passport and the like.

In an embodiment of a security document according to the invention, the lenses comprise cylindrical lenses, the two authentication images being placed below the lenses in an interlaced configuration. With such cylindrical lenses a strong tilt effect of the positive and negative image can be achieved.

In another embodiment of a security document according to the invention, the first image comprises a portrait, the authentication images both comprising reference points that are placed in such positions in the image layer that they are viewed in similar positions by a user observing the security document.

The reference points in the authentication images may comprise the eyes, corners of the mouth, eyebrows and other facial positions. By placing these reference points in the image layer such that they are observed to overlap, the light to dark transition of the authentication images combines in the vision of the user in a way to generate a one to one comparison of the light positive and the dark negative image.

For a good comparison of the light and dark authentication image, the authentication images may be observable under different viewing angles relative to a perpendicular viewing direction that is perpendicular to the image area.

By the asymmetry of the authentication images relative to the perpendicular viewing direction, it is prevented that the image combine in the eyes of the inspecting person to form a combined light and dark image, from which detection of relative differences would be more difficult.

Preferably, the angles of observation/laser engraving of the first and second authentication images relative to the perpendicular viewing direction, are between +10° and +20°, and −10° and −20° respectively, the difference in angle to the perpendicular direction for the positive and negative images being at least 1°, preferably at least 2°.

When looking straight at the identification image in a perpendicular viewing direction, only the positive authentication image is visible in one embodiment. Only upon tilting, the negative image becomes visible.

A method of providing a security document, comprises the steps of:
  providing an image layer with an array of cylindrical lenses,
  providing an identification image in an image processing unit, the identification image having image elements with predetermined brightness values on a positive brightness scale,
  providing in the image processor unit a positive authentication image corresponding with the first image with picture elements having brightness values that correspond to the brightness values of the identification image and a negative authentication image corresponding with the first image, with picture elements having brightness values that correspond to a reversed brightness scale in which the brightest picture elements in the positive brightness scale appear darkest and the darkest picture elements appear brightest, and
  laser engraving the first and second authentication images through the cylindrical lenses in the image layer at different angles.

In the image processor the negative image can be easily derived by reversing the scale of the brightness values of the positive image.

Because the angles of the positive and negative authentication images differ from the perpendicular viewing direction, a perspective distortion causes a shift and a change in width of the images. The width, height and shape of the images is changed in a trapezoid way. A correction can be made to compensate for this distortion by changing the width of at least one of the positive and negative images and shifting the position of the image sideways so that the eyes of the positive and negative authentication images are again aligned.

In order to prevent stereoscopic viewing of the positive and negative authentication images, they are laser engraved at mutually different angles with respect to the perpendicular viewing direction. A perspective view correction is carried out for at least one the authentication images in the image processing unit.

BRIEF DESCRIPTION OF THE DRAWINGS

Some embodiments of a security document according to the invention will by way of non-limiting example be explained in detail with reference to the accompanying drawing. In the drawings.

DETAILED DESCRIPTION OF THE INVENTION

Figure 1:
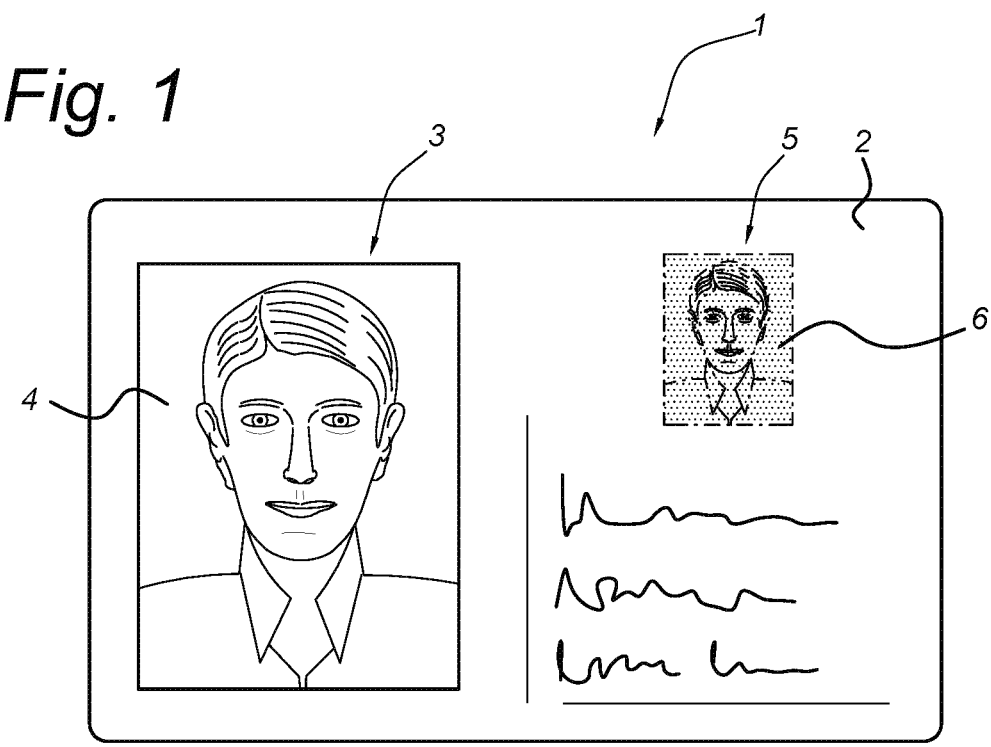
FIG. 1 shows an embodiment of an identity card with an authentication image according to the invention.

FIG. 1 shows a security document 1, such as an identity card, a bank or credit card, a passport or the like. The document 1 comprises an image layer 2, which may for instance be composed of polycarbonate material. The image layer 2 has in a first image area 3 a primary image or "identification image" which in this example is formed by a passport photograph 4 of the holder of the document. The passport photograph may be a two dimensional photograph or may be a stereoscopic image such as described in EP 0 219 012 and may be printed onto the image layer 2 or laser engraved therein.

In a second image area 5, a secondary image or "authentication image" 6 is provided. The authentication image is situated below lenses and is composed of at least two images: one positive image 7 corresponding to the passport photograph 4 and one negative image 8 of the passport photograph 4. Both images 7, 8 are interlaced and situated below a lenticular array, such that when viewing the images 7,8 at different angles from the perpendicular viewing direction, either the positive image 7 or negative image 8 is observed. Viewing the document 1 at different angles can be effected by tilting of the document around a vertical axis in the plane of the drawing.

When tilting the document from one viewing angle to the other, the image 7 will flip to show the image 8. As these images 7, 8 form the positive and negative views of the same portrait image 4, any difference of the image 8 or image 7 with the portrait image 4 as well as mutual differences between images 7 and 8 are immediately apparent. It is submitted that the fact that both images 7,8 are viewed in rapid succession causes them to be somewhat superimposed upon viewing. By ensuring that specific image locations such as eyes, corners of the mouth, chin, cheekbones etc. in images 7 and 8 are located in the same position, and remain in the same position upon tilting of the image—i.e. the images 7,8 are except from being positive and negative, further identical—the mutual comparison upon tilting is improved.

Figure 2:
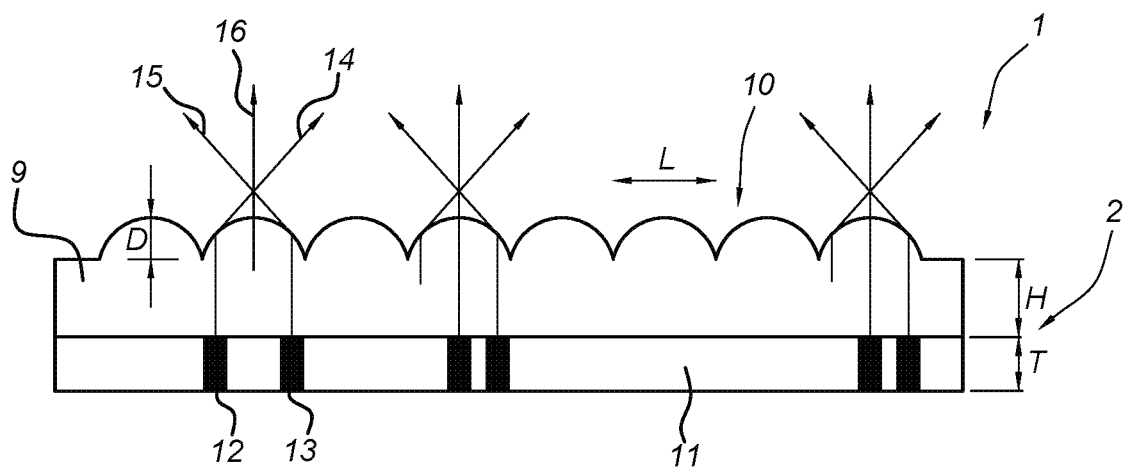
FIG. 2 shows a schematic view of laser engraving interlaced pixel tracks below a lenticular array.

FIG. 2 shows a cross-section of the image layer 2 in the second image area 5. An array of lenticular lenses 10 overlies a substrate 11 which may be formed of a laser sensitized polycarbonate. A top layer 9 having the lenses 10 overlies the substrate 11 and may be laminated with the substrate to form an integrated structure. A laser is focused by the lenses 10 and causes blackened pixel tracks along image lines 12, 13. The images 7,8 are interlaced such that pairs of image lines 12,13 are each time grouped below a single lens. The image lines 12,13 can be observed along different viewing directions 14, 15 relative to a perpendicular viewing direction 17. The height H of the substrate 11 may for instance be about 250 μm, the thickness T of the image layer 9 may for instance be 50 μm. The width L of a lens element may be for instance 75 μm and a height D may be about 10 μm.

Figure 3:
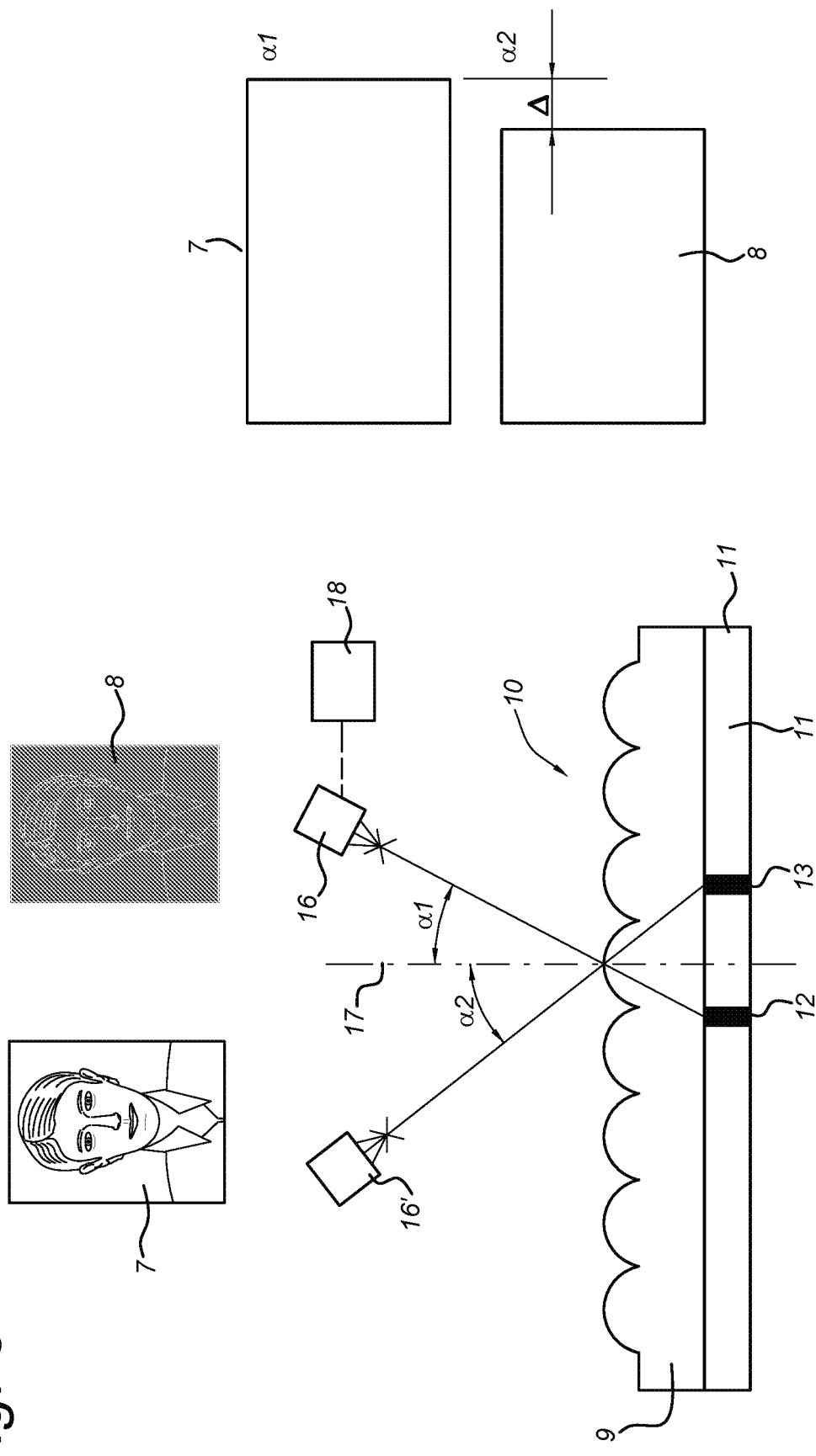
FIG. 3 shows a schematic view of laser engraving two images at different angles, and FIGS. 4a and 4b schematically show for an image the brightness distributions of pixels for the positive version of the image and for the negative version.

FIG. 3 schematically shows two positions 16, 16' of a laser that engraves the image lines 12,13 at different angles α1, α2 relative to the perpendicular direction 17. The asymmetric position of the image lines 12,13 prevents the possibility that the two images 7,8 can both be observed at one viewing angle, one with each eye, which would cause a stereoscopic image composed of the positive and negative images 7,8. This would prevent an accurate comparison. It is preferred that the angle α2 of the positive image 8 corresponds to the perpendicular viewing direction, such that upon regular viewing of the portrait image 4, only the positive image 8 is visible.

It is schematically shown in FIG. 3 that image 7 written at the smaller angle α1 is compressed in the width direction compared to the image 8 by a length Δ. In an image processor 18, which may be a stand-alone processor or which may be connected to a control unit of the laser 16, 16', this length difference Δ between the images 7 and 8 is compensated prior to laser engraving of the image 8 into the image layer 11.

Figure 4A:
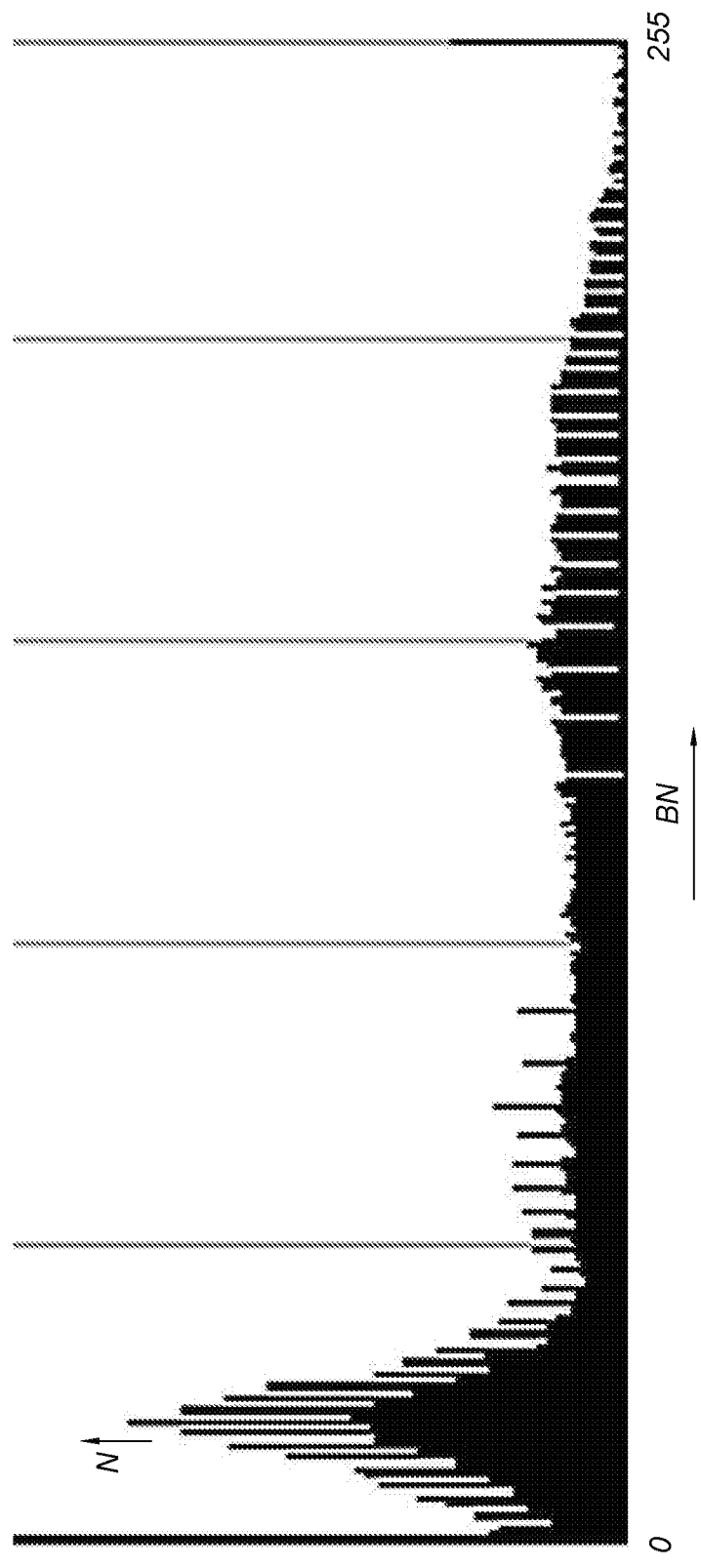
Figure 4B:
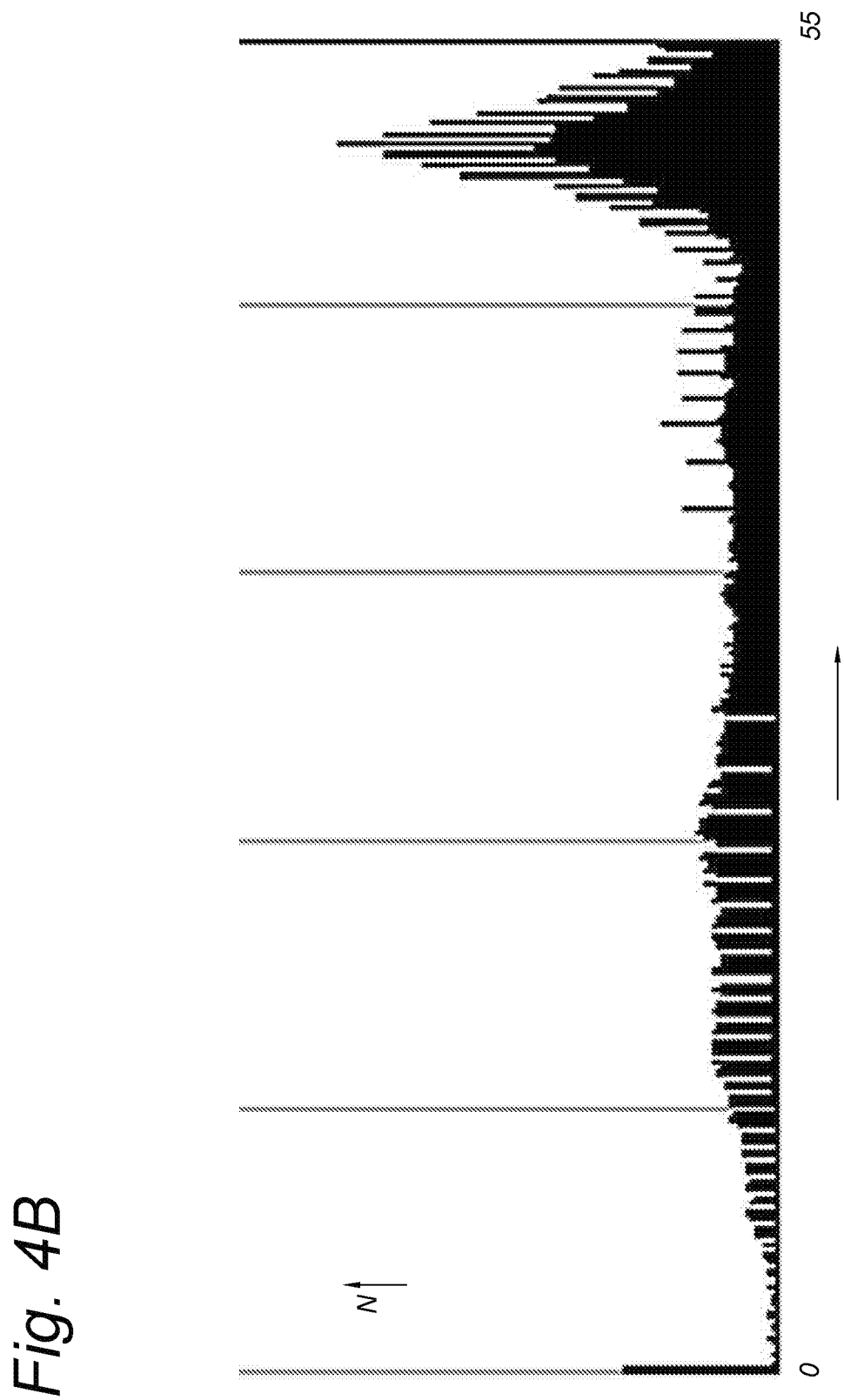

FIG. 4a schematically indicates the histogram of the brightness values Bp of the pixels of the positive image 7. FIG. 4b shows the histogram of the brightness values Bn of the negative image 8 that can be calculated in the image processor 18 by reversing the positive brightness scale Bp.

The invention claimed is:

1. A method of providing a security document (1), comprising steps of:
    providing an image layer (2) with an array of cylindrical lenses (10);
    providing an image processing unit (18) with an identification image having image elements with predetermined brightness values (Bp) on a positive brightness scale;
    providing the image processing unit (18) with a positive authentication image (7) corresponding to the identification image (4) with picture elements having brightness values that correspond to brightness values of the identification image (4), and a negative authentication image (8) corresponding to the identification image and with picture elements having brightness values (Bn) that correspond to a reversed brightness scale in which brightest one of the picture elements in the positive brightness scale appear darkest and darkest one of the picture elements appear brightest; and
    laser engraving the positive authentication image (7) and the negative authentication image (8) through the cylindrical lenses (10) in the image layer (2) at first and second angles (α1, α2), respectively, such that both the identification image (4) and the first authentication image (7) are observable at a perpendicular viewing direction, and the second authentication image (8) is observable at a non-perpendicular viewing direction.

2. The method according to claim 1, wherein in the image processor unit (18), the first and second authentication images (7,8) are transformed such that they are viewable in similar positions by a user observing the security document at different angles.

3. The method according to claim 1, wherein the first and second authentication images (7,8) are laser engraved in the image layer (2) from mutually different angles (α1, α2) relative to a perpendicular viewing direction (17).

4. The method according to claim 3, wherein in the processing unit (18), a transformation is carried out on one of the first and second authentication images (7,8) to correct a width of the one of the first and second authentication images so that respective widths of the first and second authentication images (7,8) are equal.

5. The method according to claim 2, wherein the first and second authentication images (7,8) are laser engraved in the image layer (2) from mutually different angles (α1, α2) relative to a perpendicular viewing direction (17).

* * * * *